United States Patent
Suzuki et al.

(10) Patent No.: US 7,018,466 B2
(45) Date of Patent: Mar. 28, 2006

(54) PROCESS FOR PRODUCING A CONCRETE AND A MORTAR

(75) Inventors: Motoyuki Suzuki, 6-14 Fukuzawa-machi, Aoba-ku, Sendai-shi, Miyagi (JP); Kazuhiro Kasai, Chiyoda-ku (JP); Masato Terazawa, Chiyoda-ku (JP); Kazuyuki Nishiura, Chiyoda-ku (JP); Hisashi Ando, Hiroshima (JP); Toshihiko Kawamura, Nerima-ku (JP)

(73) Assignees: Motoyuki Suzuki, Miyagi (JP); Tobishima Corporation, Tokyo (JP); Aston Co., Ltd., Okayama (JP)

( * ) Notice: Subject to any disclaimer, the term of this patent is extended or adjusted under 35 U.S.C. 154(b) by 0 days.

(21) Appl. No.: 11/032,966

(22) Filed: Jan. 10, 2005

(65) Prior Publication Data

US 2005/0155524 A1 Jul. 21, 2005

Related U.S. Application Data

(62) Division of application No. 10/389,188, filed on Mar. 14, 2003, now abandoned.

(30) Foreign Application Priority Data

| Mar. 26, 2002 | (JP) | ............................. 2002-086976 |
| Aug. 29, 2002 | (JP) | ............................. 2002-251249 |

(51) Int. Cl.
*C04B 28/00* (2006.01)

(52) U.S. Cl. ...................................... 106/638; 106/608

(58) Field of Classification Search ................ 106/634, 106/608
See application file for complete search history.

(56) References Cited

U.S. PATENT DOCUMENTS

| 2,625,492 A | 1/1953 | Young |
| 3,345,302 A | 10/1967 | Netting et al. |
| 3,782,984 A | 1/1974 | Allemand et al. |
| 3,827,869 A | 8/1974 | Von Bonin |
| 4,892,586 A | 1/1990 | Watanabe et al. |

FOREIGN PATENT DOCUMENTS

| EP | 0 507 368 | 10/1992 |
| EP | 0 856 501 | 8/1998 |
| EP | 1 081 114 | 3/2001 |
| JP | 294461 | 10/2001 |
| WO | WO 01/90024 A1 | 11/2001 |

OTHER PUBLICATIONS

Wang Renfang, 16(4), 1999: p 310-313, published on Dec. 25, 1999 in China.
Dictionary of Chemical Industry, Ed. by Wang Jian, P. 336, published on Aug. 2000 in China.
Inorganic Chemistry, Inorganic Chemistry Research Centre of Dalian Institute Technology, 3$^{rd}$ ed., P. 566, published Apr. 1990 in China.

*Primary Examiner*—Elizabeth D. Wood
(74) *Attorney, Agent, or Firm*—Koda & Androlia (57) ABSTRACT

A concrete admixture or a mortar admixture which is obtained by mixing a silicate with an acid in the presence of water and then solidifying the mixture. It is preferable that the silicate is sodium silicate and the acid is a carboxylic acid. This admixture can improve a tensile strength of a concrete or a mortar. Since a concrete or a mortar containing the admixture, cement, an aggregate and water is high in tensile strength, it can advantageously be used in various concrete structures, concrete products or mortar products.

20 Claims, 4 Drawing Sheets

PROCESS FOR PRODUCING A CONCRETE AND A MORTAR

This is a divisional application of application Ser. No. 10/389,188, filed Mar. 14, 2003 now abandoned, which is hereby incorporated in its entirety by reference.

BACKGROUND OF THE INVENTION

1. Field of the Invention

The present invention relates to a concrete admixture which is added to a concrete. More specifically, it relates to a concrete admixture which is obtained by mixing a silicate with an acid in the presence of water and then solidifying the mixture, a process for producing the same, a concrete using the concrete admixture, a process for constructing a concrete structure using the concrete admixture, and a process for producing a concrete product using the concrete admixture. Further, it relates to a mortar admixture which is added to a mortar, a process for producing the same, a mortar using the mortal admixture, and a process for producing a mortar product using the mortal admixture. Still further, the invention relates to blended cement.

2. Description of the Related Art

Since a concrete is high in compressive strength, easy to mold and less costly, it has so far found wide acceptance in the construction field. In recent years, since structures in particular are large-sized and diversified, many studies have been made for more enhancing a compressive strength of a concrete. In order to increase a strength of a concrete, for example, a method using various admixtures has been reported. This is the same with a mortar.

JP-A-61-155237 (U.S. Pat. No. 4,892,586) discloses a method for producing a dam concrete characterized in that an organic acid and a set accelerating inorganic salt are contained therein. It describes that a strength can be increased by containing an organic acid and a set accelerating inorganic salt without the increase in exothermic heat, and that the method is suited for placing a large amount of a concrete such as a dam concrete. Examples of the organic acid used here include various carboxylic acids such as citric acid and fumaric acid, and examples of the set accelerating inorganic salt include alkali metal salts such as sodium carbonate and sodium silicate. In Examples of this document, the improvement in compressive strength is specifically confirmed.

JP-A-2001-294461 describes a concrete modifier containing water glass and a polycarboxylic acid or derivatives thereof. This concrete modifier is coated on a surface of a concrete after cured in solution. It is described that deterioration due to neutralization of a concrete or occurrence of cracks can thereby be prevented or suppressed.

The most important mechanical characteristics of a concrete are that a compressive strength is high while a tensile strength, a shear strength and a flexural strength are low. In general, although a compressive strength of a concrete can be increased, a tensile strength of a concrete is limited. Thus, it is difficult to increase a tensile strength beyond the limit. Accordingly, in a site where a concrete structure is constructed, occurrence of cracks owing to an insufficient tensile strength is a serious problem.

Since a concrete is low in tensile strength in comparison to a compressive strength, the strength designing is performed using separately a reinforcement against a tensile force upon neglecting a tensile strength of a concrete for securing a safety. As the reinforcement, a reinforcing steel and a prestressing steel are listed. A strength in a whole structure is actually secured upon using these members. However, since structures are large-sized and diversified as stated above, an amount of steel used for securing the strength of the concrete structures is increased, and excessive bar arrangement is thus unavoidable. In this case, a fluid concrete is not satisfactorily charged when placed in a form, or a work of bar arrangement is itself intricate, which leads to the increase in costs.

A concrete of which the temperature is increased by heat generation owing to a hydration reaction after placing is shrunk in cooling. When both ends of a concrete are confined in shrinking, a tensile stress is generated, whereby occurrence of cracks is often induced. It is thus important to increase a tensile strength of a concrete within a relatively short period of ageing time during which a hydration reaction proceeds. Further, a concrete immediately after placing is wet. However, when a concrete is exposed to air, it is shrunk by drying. To cope with shrinkage by long-term drying, it is important to increase a tensile strength of a concrete.

A method in which a short fiber reinforcement made of inorganic fibers such as asbestos and glass fibers or synthetic fibers is used to improve a tensile strength of a concrete has been known. In this method, however, a fluidity might be impaired, or a dispersibility of a reinforcement might be insufficient to form clumps, which leads to the increase in costs. Accordingly, this method is used only in limited applications.

In the method described in JP-A-61-155237, a strength is increased by adding an admixture to a concrete. However, only a compressive strength is increased, and there is no description on a tensile strength. In the method described in JP-A-2001-294461, the modifier is coated on the surface of the cured concrete, and the deterioration of the concrete such as occurrence of cracks can be prevented, but a tensile strength is not positively increased.

SUMMARY OF THE INVENTION

The invention has been made for solving the problems, and it is to provide an admixture which can improve a tensile strength by being added to a concrete and a process for producing the same. Further, it is to provide a concrete using the concrete admixture, a process for constructing a concrete structure using the same, and a process for producing a concrete product using the same.

The problems associated with the concrete are also applied to a mortar. The invention has been made to solve such problems too, and it is to provide an admixture which can improve a tensile strength by being added to a mortar, and a process for producing the same. Further, it is to provide a mortar using the mortar admixture, and a process for producing a mortar product using the same. Still further, the invention is to provide blended cement which is advantageously used in such a concrete or mortar.

The foregoing problems are attained by providing a concrete admixture which is obtained by mixing a silicate with an acid in the presence of water and then solidifying the mixture. That is, the concrete admixture of the invention is obtained by mixing a silicate with an acid in the presence of water and then solidifying the mixture. The cause that the addition of such an admixture increases the tensile strength of the cured concrete is not altogether clarified. However, the following mechanism is presumed.

The mechanism of the hydration reaction of cement is complicated, and has not completely been clarified at present. However, a typical hydration reaction is represented by, for example, the following reaction formula (1). The numerical values in formula (1) are only illustrative, and in an actual reaction, they are to be understood within certain ranges. Further, compounds not shown here participate in a hydration reaction.

$$2(2CaO.SiO_2)+4H_2O \rightarrow 3CaO.2SiO_2.3H_2O+Ca(OH)_2 \quad (1)$$

Thus, as a result of the hydration reaction, calcium silicate hydrate [$xCaO.SiO_2.yH_2O$] (usually, x is a value of from 1.5 to 2.0, and y is a value in a slightly wider range) and calcium hydroxide $Ca(OH)_2$ are formed as main hydration reaction products. Of these, the calcium silicate hydrate is a main component that usually occupies more than a half volume in portland cement completely cured. It is deemed that the calcium silicate hydrate takes a fibrous or network shape and can strongly be bonded by the van der Waals force. Meanwhile, since calcium hydroxide is a hexagonal prism crystal having a small surface area, the van der Waals force is low, and it is liable to tear owing to crystal orientation, less contributing to a bonding strength.

A position in a concrete which has the lowest strength and tends to crack due to a tensile stress is deemed to be a so-called transition zone formed mainly in an interface between a coarse aggregate and a mortar. When a concrete is placed in a form, a water film is formed by bleeding around a large aggregate or a reinforcement, especially under it, and a transition zone, a region in which a water content based on cement is high occurs. In this transition zone, a proportion of calcium hydroxide is higher than in a mortar portion. This is deemed to be a factor of decreasing a strength of a transition zone and also a tensile strength of a concrete.

It is presumed that the concrete admixture of the invention helps convert calcium hydroxide present in this transition zone into strong calcium silicate hydrate by the following reaction. Formation of calcium silicate hydrate by a reaction of sodium metasilicate and calcium hydroxide is represented by, for example, the following reaction formula (2).

$$2Na_2SiO_3+3Ca(OH)_2+2H_2O \rightarrow 3CaO.2SiO_2.3H_2O+ 4NaOH \quad (2)$$

The actual chemical reaction in a concrete is not such a quantitative reaction, and the numerical values in formula (2) have to be understood in certain ranges as is the case with formula (1).

However, when an aqueous solution obtained by mixing a silicate, an acid and water is added as such to a fluid concrete, a fluidity of the concrete is decreased, and the concrete is hardly placed in a form. This is presumably because the reaction of formula (2) proceeds too rapidly in a concrete.

With respect to the concrete admixture of the invention, it is presumed that while the fluidity of the concrete is maintained in placing, the reaction of formula (2) can proceed in the transition zone in curing after placing. It is further presumed that when the admixture obtained by mixing a silicate with an acid in the presence of water and then solidifying the mixture is added to the concrete, the fluidity of the concrete is not impaired and the hydration reaction of formula (2) then proceeds, with the result that the silicate component can be fed to the transition zone.

In fact, the present inventors have confirmed that an admixture obtained by mixing a silicate with an acid in the presence of water and then drying the mixture for solidification is, unlike an admixture obtained by only drying a silicate for solidification, much decreased in water solubility showing a behavior of slow dissolution in water over a long period of time. It is presumed that since silicic acid such as orthosilicic acid or metasilicic acid is a very weak acid, an acid-base reaction (neutralization reaction) proceeds in which a weak acid (silicic acid) is liberated through a reaction with a stronger acid (for example, a carboxylic acid) to form a stronger acid salt.

The problems of the invention are solved by the concrete admixture obtained by mixing the silicate with the acid in the presence of water and then solidifying the mixture through the above-presumed mechanism. In the concrete admixture of the invention, the silicate is preferably sodium silicate, and the acid is preferably a carboxylic acid. The concrete admixture is preferably a powder or granules. The problems of the invention are solved by providing a concrete admixture including a powder or granules containing a reaction product of a silicate and an acid.

The problems of the invention are also solved by providing a process for producing a concrete admixture, which includes mixing a silicate with an acid in an aqueous solution, and then removing water from the aqueous solution for solidification.

A preferred embodiment of the invention is a concrete including the concrete admixture, cement, an aggregate and water. A process for constructing a concrete structure, which includes placing a fluid concrete containing cement, an aggregate, the concrete admixture and water in a form, and curing the fluid concrete is also a preferred embodiment of the invention. At this time, it is preferable that the concrete admixture is added to a fluid concrete containing cement, an aggregate and water and the blend is then placed in a form. Further, a process for producing a concrete product, which includes placing a fluid concrete containing cement, an aggregate, the concrete admixture and water in a form, and curing the fluid concrete is also a preferred embodiment. At this time as well, it is preferable that the concrete admixture is added to a fluid concrete containing cement, an aggregate and water and the blend is then placed in a form.

The foregoing problems are also attained by providing a mortar admixture which is obtained by mixing a silicate with an acid in the presence of water and then solidifying the mixture, as well as a mortar admixture including a powder or granules containing a reaction product of a silicate and an acid. Further, the problems are attained by providing a process for producing a mortar admixture, which includes mixing a silicate with an acid in an aqueous solution, and then removing water from the aqueous solution for solidification. A preferred embodiment of the invention is a mortar including the mortar admixture, cement, a fine aggregate and water. A process for producing a mortar product, which includes forming a fluid mortar containing cement, a fine aggregate, the mortar admixture and water, and curing the blend is also a preferred embodiment of the invention.

Moreover, the problems are attained by providing blended cement which is obtained by blending cement with a powder or granules obtained by mixing a silicate with an acid in the presence of water and then solidifying the mixture, as well as blended cement which is obtained by blending cement with a powder or granules containing a reaction product of a silicate and an acid. At this time, it is preferable that the water content of the powder or the granules is 10% by weight or less.

PREFERRED EMBODIMENTS OF THE INVENTION

The concrete admixture of the invention is obtained by mixing a silicate with an acid in the presence of water and then solidifying the mixture.

The silicate used in the invention is not particularly limited. Its cationic species may be not only a metal ion but also an ammonium ion, and the metal ion is preferable. With respect to the metal ion, an alkali metal ion is preferable. A sodium ion is more preferable in view of easy procurement of a starting material and cost. An anionic species of the silicate used in the invention is not particularly limited. It may be not only an anionic species such as orthosilicate anion $[SiO_4^{4-}]$ or metasilicate anion $[SiO_3^{2-}]$ but also an anionic species in which plural silicate $[SiO_2]$ units are bound.

Specific examples of the compound include sodium orthosilicate, potassium orthosilicate, lithium orthosilicate, sodium metasilicate, potassium metasilicate, lithium metasilicate and water glass.

Of these, water glass is preferably used in the invention. Water glass is an aqueous solution of an alkali metal silicate in which plural silicate $[SiO_2]$ units are bound to form an anionic species. The alkali metal used here is usually sodium, and potassium is also available. Sodium silicate as a solid content is represented by the formula $Na_2O \cdot nSiO_2$.

A ratio of a metal atom to a silicon atom [metal/silicon] in the silicate is preferably from 0.1 to 2. When the [metal/silicon] ratio is less than 0.1, the water solubility is reduced, and the silicate might be less mixed with a carboxylic acid in the presence of water. It is more preferably 0.2 or more, further preferably 0.3 or more. When the [metal/silicon] ratio exceeds 2, the water solubility of the silicate is too high, which might worsen the fluidity of the concrete. It is more preferably 1.5 or less, further preferably 1 or less.

The type of the acid mixed with the silicate in the invention is not particularly limited. It may be an inorganic acid such as sulfuric acid or phosphoric acid, or an organic acid such as a carboxylic acid. Of these, a carboxylic acid is preferably used. The carboxylic acid used is not particularly limited. Examples thereof can include monocarboxylic acids such as formic acid, acetic acid and propionic acid; oxymonocarboxylic acids such as glycolic acid, lactic acid and gluconic acid; polycarboxylic acids such as oxalic acid, malonic acid, succinic acid, pimelic acid, adipic acid, glutaric acid, maleic acid, fumaric acid, phthalic acid and terephthalic acid; hydroxypolycarboxylic acids such as malic acid and citric acid; and polycarboxylic acid polymers such as an acrylic acid polymer and a maleic anhydride polymer. Of these, oxycarboxylic acids and polycarboxylic acids which are low in volatility and good in water solubility are preferable, and polycarboxylic acids are more preferable. Unsaturated polycarboxylic acids such as maleic acid and fumaric acid are also preferable.

When a metal silicate and a carboxylic acid are used in the concrete admixture of the invention, a ratio of a metal atom of the silicate to a carboxyl group of the carboxylic acid [metal/carboxyl group] is preferably from 1 to 200. When the [metal/carboxyl group] ratio is less than 1, the silicic acid component is insoluble in water, and an insoluble matter might be generated in mixing the silicate with the carboxylic acid in the presence of water, making it impossible to uniformly mix them. It is more preferably 2 or more, further preferably 5 or more, most preferably 10 or more. Meanwhile, when the [metal/carboxyl group] ratio exceeds 200, the water solubility of the silicate is too high, which might decrease the fluidity of the concrete. It is more preferably 100 or less, further preferably 50 or less.

The concrete admixture of the invention is produced by mixing the silicate with the acid in the presence of water as stated above. It is presumed that by the mixing in the presence of water, a neutralization reaction (salt formation) can proceed between the cationic species constituting the silicate and the acid to properly decrease the water solubility of the silicate. The amount of water present in the mixing is preferably 1 part by weight or more, more preferably 10 parts by weight or more, further preferably 100 parts by weight or more per 100 parts by weight in total of the silicate and the acid. The mixing method is not particularly limited so long as these components are mixed in a fluid state. A method in which the silicate and the acid are mixed with stirring in the state of an aqueous solution is preferable. For example, a method in which a carboxylic acid or its aqueous solution is added to water glass and the mixture is stirred is mentioned. For facilitating the stirring, it is advisable that they are mixed at elevated temperature.

The concrete admixture of the invention is produced by mixing the components as stated above and then solidifying the mixture. The mixture may be solidified by removing water or by cooling. A method in which, after mixing the silicate with the acid, water is removed from an aqueous solution for solidification is preferable. A method for removing water is not particularly limited. Water may be volatilized by allowing the aqueous solution to stand at room temperature or by heating it. After removing water, the water content is preferably 50% by weight or less, more preferably 40% by weight or less, further preferably 30% by weight or less. The concrete admixture of the invention, even in the solid state, contains a considerable amount of water therein. As will be later described, when producing blended cement in which the concrete admixture has been incorporated, it is preferable that the water content is further reduced. The water content here referred to is a value measured by the method described in JIS K0101-16.2.

The concrete admixture of the invention is a concrete admixture comprising a powder or granules containing the reaction product of the silicate and the acid. The reaction product here referred to is a product obtained by an acid-base reaction (neutralization reaction) in which a weak acid (silicic acid) is liberated to form a stronger acid salt. The concrete admixture containing such a reaction product in the invention can bring forth the effects of the invention. As stated above, it is preferable that the concrete admixture is produced by mixing the silicate with the acid in the presence of water and then solidifying the mixture. However, the concrete admixture produced by this method is not critical, and a concrete admixture finally containing the reaction product is also available. A powder or granules containing such a reaction product can be used as a mortar admixture or a raw material of blended cement to be described later.

The concrete admixture of the invention is preferably a powder or granules. A method for forming a powder or granules is not particularly limited. It includes a method in which the product is solidified and then pulverized, and a method in which droplets are solidified. Further, a powder or granules may be formed during solidification. In case of the powder or the granules, the particle size is not particularly limited. However, it is advisable that fine particles having a particle size of, for example, less than 100 μm, are not used as main particles. Meanwhile, it is advisable that coarse particles having a particle size of, for example, more than 10 mm, are not used as main particles.

When the particle size is too small, the fluidity of the concrete might be decreased in adding the concrete admixture of the invention to the concrete. Meanwhile, when the particle size is too large, the cured concrete might be nonuniform. Further, when the particle size is too small or too large, the tensile strength tends to be less improved. The tensile strength is greatly improved by using particles having an appropriate particle size. Although the reason is not clear, it is presumed that with an appropriate particle size, the silicate component can properly be fed to the transition zone when the hydration reaction proceeds well after placing the concrete.

Preferable particle size varies with a chemical composition or a water content of the concrete admixture or a method in which the concrete admixture is added to the concrete. Thus, it has to be properly adjusted. It is advisable that an amount of particles having a small particle size is not too large. For example, the amount of particles which are not passed through a 1.25 mm-mesh sieve is preferably 50% by weight or more, more preferably 80% by weight or more. Meanwhile, it is advisable that an amount of particles having a large particle size is not too large. For example, the amount of particles which are passed through a 2.5 mm-mesh sieve is 50% by weight or more, more preferably 80% by weight or more. By the way, the size of the mesh is as defined in JIS Z8801.

The concrete obtained in the invention comprises cement, an aggregate, water and the concrete admixture. The concrete here referred to includes both a fluid concrete (fresh concrete) before placing and a cured concrete after placing.

Cement used at this time may be hydraulic cement containing calcium silicate, and portland cement and blast furnace cement can be used.

The concrete of the invention contains the aggregate. As noted above, it is presumed that the concrete admixture of the invention improves a bonding strength mainly in the transition zone which is an interface between the coarse aggregate and the mortar. Accordingly, it is significant that the concrete admixture is added to the concrete containing the aggregate. The aggregate used is not particularly limited. An aggregate obtained from natural minerals, an aggregate using a blast-furnace slag, a fly ash or a waste concrete as a raw material, and an artificial aggregate can be used. The amount of the aggregate is preferably from 300 to 1,200 parts by weight, more preferably from 500 to 800 parts by weight per 100 parts by weight of cement.

The size of the aggregate is not particularly limited. A fine aggregate and a coarse aggregate may be used either singly or in combination. The fine aggregate is passed through a 5 mm-mesh sieve, and usually remains on a 75 μm-mesh sieve. The coarse aggregate remains on a 5 mm-mesh sieve, and its size is usually up to approximately 200 mm. The larger the size of the aggregate, the more the transition zone tends to be formed therearound. Accordingly, the concrete admixture of the invention is used quite advantageously in the concrete containing the coarse aggregate. The amount of the coarse aggregate is preferably from 100 to 800 parts by weight, more preferably from 150 to 500 parts by weight per 100 parts by weight of cement. It is preferable to contain the fine aggregate in addition to the coarse aggregate. The amount of the fine aggregate is preferably from 100 to 800 parts by weight, more preferably from 150 to 500 parts by weight per 100 parts by weight of cement.

The amount of water incorporated in the concrete of the invention is preferably from 20 to 75 parts by weight, more preferably from 30 to 60 parts by weight per 100 parts by weight of cement.

The concrete of the invention contains the concrete admixture in addition to cement, an aggregate and water. The amount of the concrete admixture is preferably from 0.1 to 20 parts by weight per 100 parts by weight of cement. When the amount is less than 0.1 part by weight, the tensile strength might be less improved. The amount is more preferably 0.5 part by weight or more, further preferably 1 part by weight or more. When the amount exceeds 20 parts by weight, the fluidity of a concrete might be decreased, and the tensile strength might be rather less improved. The amount is more preferably 10 parts by weight or less, further preferably 5 parts by weight or less.

The concrete may contain components other than the foregoing components unless the effects of the invention are impaired. Known additives such as a water reducing agent, an air entraining agent, a superplasticizer and a setting retarder can be incorporated according to applications and properties required. In some applications, it is advisable to incorporate a short fiber reinforcement made of inorganic fibers such as asbestos and glass fibers or synthetic fibers.

A process for producing the concrete of the invention is not particularly limited. The foregoing materials may be simultaneously blended and kneaded, or successively added and blended. For example, the concrete may be produced by kneading the materials at once in a ready mixed concrete plant. However, for keeping good a fluid state before placing, it is preferable that the concrete admixture of the invention is added to a fluid concrete comprising cement, an aggregate and water. This makes it possible to improve the tensile strength of the cured concrete while keeping good the fluidity of the concrete in placing. Specifically, a method in which a ready mixed concrete produced in a ready mixed concrete plant is transported to a site with a truck mixer and the concrete admixture of the invention is charged into the mixer in the site and placed soon after kneaded is preferable. It is also possible that, as will be later described, blended cement which is obtained by blending cement with a powder or granules obtained by mixing a silicate with an acid in the presence of water and then solidifying the mixture is used as a raw material and an aggregate and water are added thereto.

The thus-obtained concrete of the invention is placed in a form in a fluid state, and cured. Since the cured concrete is increased in tensile strength, the amount of reinforcing steel used can be reduced in comparison to ordinary concrete structures. Meanwhile, when the concrete is placed in a form with steel arranged, especially in a form with steel intricately arranged, the invention can be practiced quite advantageously. The reason is that brittle portions that occur under a reinforcement due to bleeding can be reinforced by adding the concrete admixture of the invention.

The concrete of the invention can be used to construct various structures. Since the concrete structures using the concrete of the invention are high in tensile strength, they are effectively used in members in which a tensile stress tends to be generated due to an external force or a thermal stress or members which tend to be influenced by fatigue. Further, the concrete of the invention is effectively used to construct structures with complicated shapes. It can specifically be applied to road and railway installations such as pavements, piers and tunnels, port installations, airport installations, river and shore installations such as retaining walls and banks, energy plants such as a nuclear power plant and a thermal power generation plant, water treatment installations such as dams and channels, and general buildings.

The concrete of the invention can be used to produce various concrete products (concrete secondary products). In this case, concrete products of the same shape can be mass-produced in a factory. The concrete of the invention is placed in a form, and then cured to produce a concrete product. Since concrete products can be produced in a factory, various moldings such as extrusion molding, press molding, pressure molding, vibration molding, roller molding and centrifugal molding can be employed. The concrete products using the concrete of the invention are, because of the high tensile strength, useful as products susceptible to a tensile stress due to an external force or a thermal stress or as products which tend to be influenced by fatigue. Further, they are useful as products with complicated shapes or thin products. Specific examples of the concrete products include blocks, pipes, columns, piles, retaining walls and gutters.

Such are the concrete admixture, the process for producing the same and the applications thereof. The mortar admixture is described below. A mortar is a concrete without a coarse aggregate, and cement, a fine aggregate (sand) and water are commonly used as its main raw materials.

The mortar admixture of the invention is obtained by mixing a silicate with an acid in the presence of water and then solidifying the mixture. As the components constituting the mortar admixture of the invention, the components constituting the concrete admixture of the invention can be used.

The mortar obtained in the invention comprises cement, the fine aggregate, water and the mortar admixture. The mortar here referred to includes both of a fluid mortar before curing and a cured mortar. As the cement used here, the cement used in the concrete is available.

The mortar of the invention contains the fine aggregate, but not the coarse aggregate. In the concrete admixture of the invention, as stated above, the tensile strength seems likely to be improved by improving the bonding strength in the transition zone which is the interface between the coarse aggregate and the mortar. Since the tensile strength is improved in the mortar of the invention, the bonding strength seems likely to be improved also in the interface between the fine aggregate and the cement paste.

The fine aggregate is passed through a 5 mm-mesh sieve, and usually remains on a 75 μm-mesh sieve. The fine aggregate used in the mortar of the invention is not particularly limited. A fine aggregate obtained from natural minerals such as sand, a fine aggregate using a blast furnace slag, a fly ash or a waste concrete as a raw material, and an artificial aggregate can be used. The amount of the fine aggregate is preferably from 100 to 800 parts by weight, more preferably from 150 to 500 parts by weight per 100 parts by weight of cement.

The amount of water incorporated in the mortar of the invention is preferably from 20 to 75 parts by weight, more preferably from 30 to 60 parts by weight per 100 parts by weight of cement. The amount of the mortar admixture added to the mortar of the invention is preferably from 0.1 to 20 parts by weight per 100 parts by weight of cement. When the amount is less than 0.1 part by weight, the tensile strength might be less improved. The amount is more preferably 0.5 part by weight or more, further preferably 1 part by weight or more. When the amount exceeds 20 parts by weight, the fluidity of the mortar before curing might be decreased, and the tensile strength might be rather less improved. The amount is more preferably 10 parts by weight or less, further preferably 5 parts by weight or less.

The mortar may contain components other than the foregoing components unless the effects of the invention are impaired. Known additives such as a water reducing agent, an air entraining agent, a superplasticizer, a setting retarder, an expansive admixture and a set accelerating agent can be incorporated according to applications and properties required. In some applications, it is advisable to incorporate a short fiber reinforcement made of inorganic fibers such as asbestos and glass fibers or synthetic fibers.

A process for producing the mortar of the invention is not particularly limited. The foregoing materials may be simultaneously blended and kneaded, or successively added and blended. Further, as will be later described, it is also possible that blended cement which is obtained by blending cement with a powder or granules obtained by mixing a silicate with an acid in the presence of water and then solidifying the mixture is used as a raw material and the fine aggregate and water are added thereto.

The thus-obtained fluid mortar is molded and then cured to produce a mortar product. The molding method is not particularly limited. The mortar may be poured into a form and then cured, or various moldings such as extrusion molding, press molding, pressure molding, vibration molding, roller molding and centrifugal molding can be employed. Further, the fluid mortar can be sprayed or trowelled onto a base member.

Since the mortar products using the mortar of the invention are high in tensile strength, they are useful as products which are susceptible to a tensile stress due to an external force or a thermal stress or products which tend to be influenced by fatigue. Further, the mortar products are also useful as products with complicated shapes or thin products. Specific examples of the mortar products include blocks, pipes, retaining walls, curbs, gutters and forms.

Such are the concrete admixture and the mortar admixture. The blended cement which is the other embodiment of the invention is described below. The blended cement of the invention is obtained by blending cement with a powder or granules obtained by mixing a silicate with an acid in the presence of water and then solidifying the mixture.

As the powder or the granules used in the blended cement of the invention, the powder or the granules used as the foregoing concrete admixture or mortar admixture are used. However, since blocking or weathering of cement has to be prevented over a long period of time in a state where the powder or the granules are blended with cement, it is advisable that the water content is low. The water content is preferably 20% by weight or less, more preferably 10% by weight or less, further more preferably 5% by weight or less, most preferably 1% by weight or less.

In the invention, the amount of the powder or the granules based on cement in the blended cement is preferably from 0.1 to 20 parts by weight per 100 parts by weight of cement. When it is less than 0.1 part by weight, the tensile strength might be less improved. The amount is more preferably 0.5 part by weight or more, further preferably 1 part by weight or more. When the amount exceeds 20 parts by weight, the fluidity of the concrete or the mortar before curing might be decreased, and the tensile strength might be rather less improved. The amount is more preferably 10 parts by weight or less, further preferably 5 parts by weight or less. As the cement used here, the cement used in the foregoing concrete or mortar is available.

This blended cement can advantageously be used as a raw material of a concrete or a mortar. Since the cement contains an appropriate amount of the powder or the granules in advance, it can be used, like ordinary cements, only by being kneaded with water, the aggregate and the like, and the procedure of blending raw materials is easy. Further, the blended cement can be distributed in the same manner as ordinary cements, and a concrete or a mortar improved in tensile strength can easily be produced in a building site or a factory.

EXAMPLES

The invention is illustrated more specifically below by referring to Examples and Comparative Examples.

Example 1

Production of Admixtures A and B 120 g of fumaric acid was charged into a vessel filled with 15 kg of water held at 60° C., and dissolved with stirring. Then, while stirring was continued, 25 kg of water glass ("JIS No. 3 Sodium Silicate", made by Toso Sangyo K.K.) was added. At this time, a viscosity was much increased temporarily in a portion to which the water glass was added, but the whole solution was homogenized with stirring. This procedure was repeated, and a wholly uniform aqueous solution free from an insoluble matter was prepared by adding the total amount of the water glass.

The water glass used here contained from 9 to 10% by weight of sodium oxide ($Na_2O$: MW=61.98) and from 28 to 30% by weight of silicon dioxide ($SiO_2$: MW=60.09). Assuming the water glass contained 9.5% by weight of sodium oxide and 29% by weight of silicon dioxide upon employing the intermediate values, a [metal/silicon] ratio was 0.64. Further, a [metal/carboxyl group] ratio (ratio of a sodium atom to a carboxyl group of fumaric acid ($C_4H_4O_4$: MW=116.07) as a dibasic acid) was 37.

The resulting aqueous solution was poured on a plastic tray to a thickness of 5 mm, and allowed to stand at room temperature for 3 days to evaporate water for solidification. The resulting solidified product was a hydrous gel having a slight flexibility. This solidified product was charged on a 2.5 mm-mesh sieve, and extruded through openings of the sieve with a rod. The extruded particles were spread on a plastic sheet, and dried by blowing hot air of 50° C. with a fan for 24 hours. After the drying, particles slightly stuck to one another were separated, and then applied to a 2.5 mm-mesh sieve. The particles passed through the sieve were designated admixture A used in this Example, and the particles remaining on the sieve were designated admixture B used in this Example. When admixture A was applied to a 1.25 mm-mesh sieve, approximately 10% by weight thereof was passed through the sieve, and approximately 90% by weight thereof remained on the sieve. Admixture B contained particles having the maximum particle size of 7 mm.

The water content of the thus-obtained admixtures A and B was measured according to JIS K0101-16.2, and found to be 25.5% by weight. Since these admixtures A and B had a moisture absorption, they were stored in a polyethylene bag with a drying agent. They were withdrawn and used whenever they were blended with a ready mixed concrete or with a fine aggregate and sand to produce a mortar.

Example 2

Production of Admixture C

An aqueous solution was prepared in the same manner as in Example 1 except that 1,440 g of citric acid was used instead of 120 g of fumaric acid. A [metal/carboxyl group] ratio of a sodium atom to a carboxyl group of citric acid ($C_6H_8O_7$: MW=192.13) as a tribasic acid was 3.4.

The resulting aqueous solution was solidified and dried as in Example 1. After the drying, particles slightly stuck to one another were separated, and then applied to a 2.5 mm-mesh sieve, and particles passed through the sieve were designated admixture C. When admixture C was applied to a 1.25 mm-mesh sieve, approximately 10% by weight thereof was passed through the sieve, and approximately 90% by weight thereof remained on the sieve. The water content of the thus-obtained admixture C was measured according to JIS K0101-16.2, and found to be 30% by weight. Since admixture C had a moisture absorption, it was stored and used as in Example 1.

Example 3

Production of Admixture D

Admixture A produced in Example 1 was charged on a frying pan, and heated on a gas heater. Since water in the admixture was evaporated by the heating, the admixture particles were swollen. However, 5 minutes later, the swelling was no longer observed, and the heating was completed. After cooling, particles slightly stuck to one another were separated, and then applied to a 2.5 mm-mesh sieve. The particles passed through the sieve were designated admixture D used in this Example. When admixture D was applied to a 1.25 mm-mesh sieve, approximately 10% by weight thereof was passed through the sieve, and approximately 90% by weight thereof remained on the sieve. The water content of the thus-obtained admixture D was measured according to JIS K0101-16.2, and found to be 0% by weight. Since admixture D had a moisture absorption, it was stored and used as in Example 1. Thus, admixture D does not contain water. Accordingly, even when cement is previously blended with the admixture, it can be stored for a long period of time without blocking or weathering, and distributed as blended cement.

Example 4

Production and Evaluation of a Concrete Containing Admixture A

For a ready mixed concrete used as a base concrete, the following raw materials were used.

1) Cement
  normal portland cement made by Ube Industries Ltd., density 3.16 g/cm$^3$, sodium content (calculated as $Na_2O$) 0.68% by weight.

2) Coarse Aggregate
  crushed stone (2005) from Kuzuu, particle size from 5 to 20 mm, solid volume percentage 60.0%, surface-dry condition density 2.70 g/cm$^3$, water absorption 0.89% by weight.

3) Fine Aggregate 1 crushed sand from Kuzuu, particle size 5 mm or less, fineness modulus 3.20, surface-dry condition density 2.63 g/cm³, water absorption 1.22% by weight.

4) Fine Aggregate 2 soil sand from Sawara, particle size 1.2 mm, fineness modulus 1.80, surface-dry condition density 2.58 g/cm³, water absorption 2.16% by weight.

5) Air Entraining and Water Reducing Agent

"Darlex WRDA" made by Grace Chemicals Co., Ltd.

The proportions of the foregoing components are as follows. The parenthesized values are amounts per 100 parts by weight of cement. A slump of this base concrete is 8 cm.

| cement | 283 kg/m³ | (100 parts by weight) |
|---|---|---|
| water | 162 kg/m³ | (57 parts by weight) |
| coarse aggregate | 1,058 kg/m³ | (374 parts by weight) |
| fine aggregate 1 | 491 kg/m³ | (173 parts by weight) |
| fine aggregate 2 | 321 kg/m³ | (113 parts by weight) |
| air entraining agent | 1.698 kg/m³ | (0.6 part by weight) |

2.5 parts by weight, per 100 parts by weight of cement, of admixture A obtained in Example 1 was added to the base concrete. After the blend was stirred with a forced action mixer for 30 seconds, the resulting blend was poured in a cylindrical form having a diameter of 100 mm and a height of 200 mm to form a concrete sample. Plural such samples were produced, and cured in air of 20° C. In this Example 4 and Examples 5 and 6 and Comparative Example 1 to be described later, samples were produced on the same date using the same base concrete, and cured under the same atmosphere.

The samples aged 7 days, 28 days and 91 days were subjected to tests for measuring strengths. A compressive strength and a split tensile strength were measured according to JIS A1108-1999 and JIS A1113-1999 respectively. At this time, three samples were used in each test (n=3), and the average value thereof was obtained. The resulting tensile strength, compressive strength and α are all shown in Table 1. In this table, α is a value shown in the following formula (3), indicating a correlation of a tensile strength and a compressive strength.

$$(\text{Tensile strength}) = \alpha \times (\text{compressive strength})^{2/3} \quad (3)$$

Figure 1:
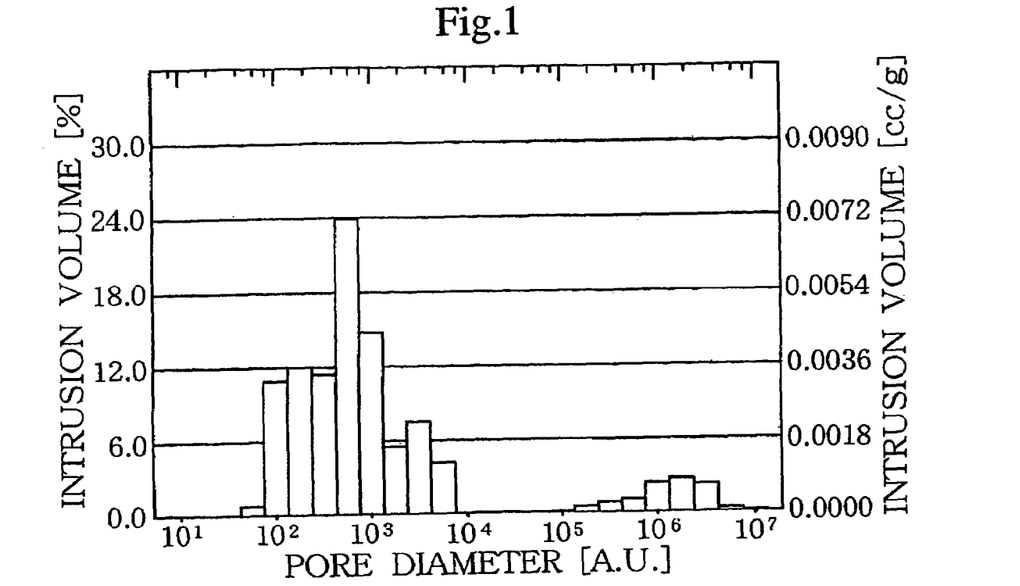
FIG. 1 is a graph showing a pore size distribution of a concrete in Example 4.
Figure 3:
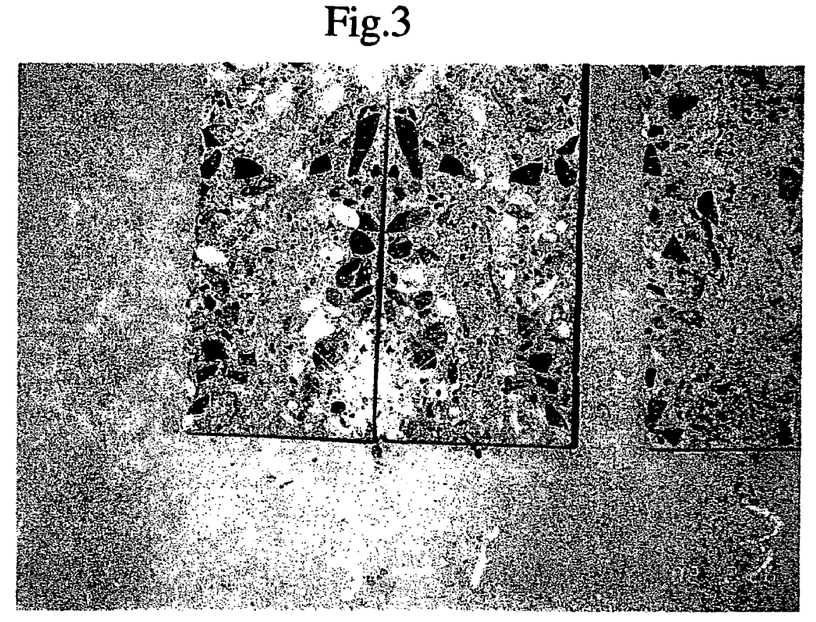
FIG. 3 is a photo of a broken surface of the concrete in Example 4.

The sample aged 28 days was measured for a secant modulus of elasticity in compression with a compressometer according to JSCE-G502-1999. The secant modulus of elasticity was approximately 30,000 N/mm², and a strain was approximately 0.002 when a compressive stress reached a maximum value. Further, the sample aged 91 days was cut out, and measured for a pore size distribution with a porosimeter. The results are shown in FIG. 1. A photo of a broken surface of the sample aged 28 days and broken in the split tensile strength test is shown in FIG. 3.

Example 5

Production and Evaluation of an Admixture B-containing Concrete

Concrete samples were produced in the same manner as in Example 4 except that 2.5 parts by weight of admixture B obtained in Example 1 was used instead of 2.5 parts by weight of admixture A. Samples aged 7 days and 28 days were subjected to the same tests for measuring strengths as in Example 4. The resulting tensile strength, compressive strength and α are all shown in Table 1. The sample aged 28 days was measured for a secant modulus of elasticity in compression as in Example 4. The secant modulus of elasticity was approximately 29,000 N/mm², and a strain was approximately 0.002 when a compressive stress reached a maximum value.

Example 6

Production and Evaluation of a Concrete Containing Admixtures A and B

Concrete samples were produced in the same manner as in Example 4 except that 2.5 parts by weight of admixture A and 2.5 parts by weight of admixture B (5 parts by weight in total of admixtures) obtained in Example 1 were used instead of 2.5 parts by weight of admixture A. The samples aged 7 days and 28 days were subjected to the same tests for measuring strengths as in Example 4. The resulting tensile strength, compressive strength and α are all shown in Table 1.

Comparative Example 1

Production and Evaluation of a Concrete Without Admixture

Figure 2:
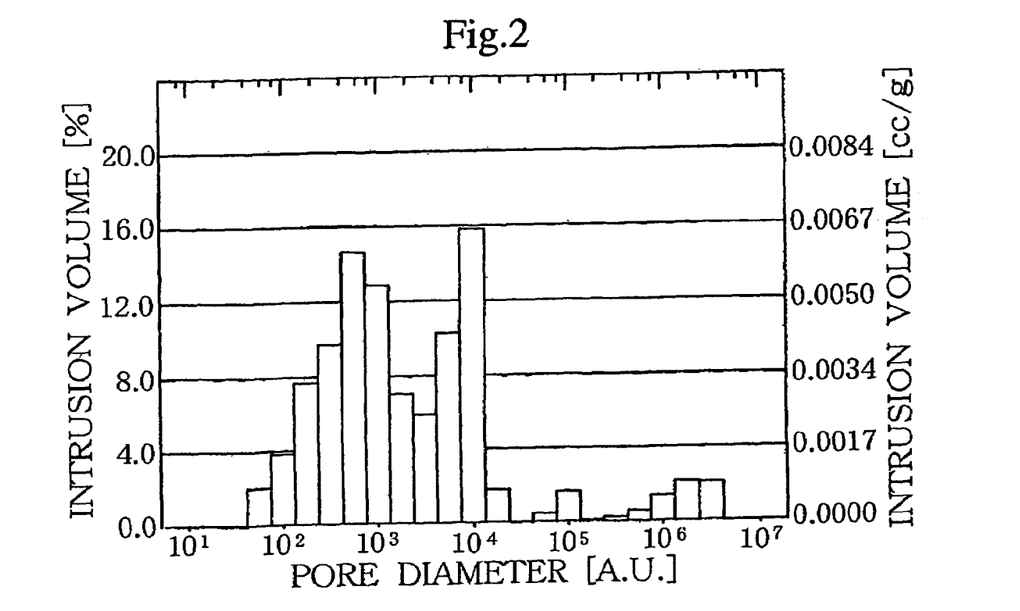
FIG. 2 is a graph showing a pore size distribution of a concrete in Comparative Example 1.
Figure 4:
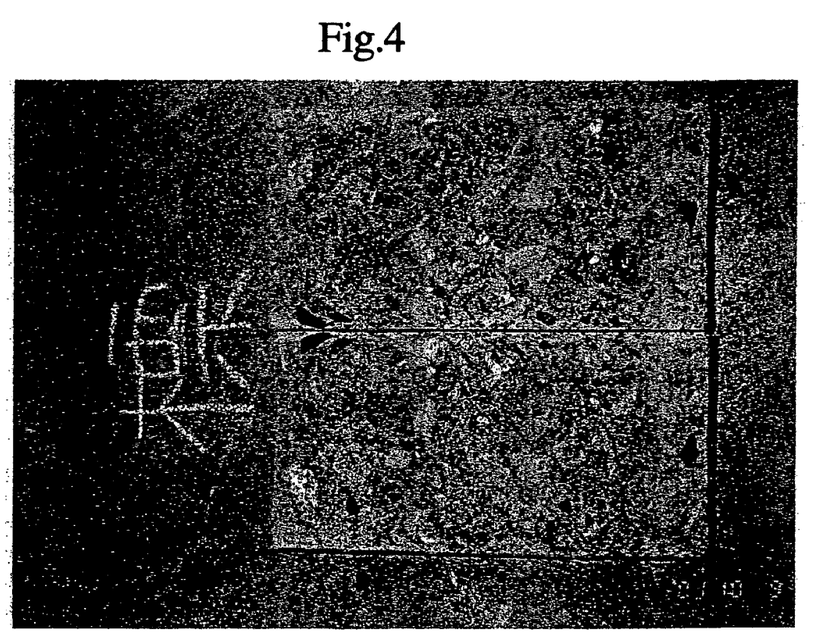
FIG. 4 is a photo of a broken surface of the concrete in Comparative Example 1.

Concrete samples were produced by pouring the base concrete alone in the form without using admixture A in Example 4, and then cured as in Example 4. The samples aged 7 days, 28 days and 91 days were subjected to the same tests for measuring strengths as in Example 4. The resulting tensile strength, compressive strength and α are all shown in Table 1. The sample aged 28 days was measured for a secant modulus of elasticity in compression as in Example 4. The secant modulus of elasticity was approximately 26,000 N/mm², and a strain was approximately 0.002 when a compressive stress reached a maximum value. Further, the sample aged 91 days was cut out, and measured for a pore size distribution with a porosimeter. The results are shown in FIG. 2. A photo of a broken surface of the sample aged 28 days and broken in the split tensile strength test is shown in FIG. 4.

Comparative Example 2

Production of a Concrete Containing an Aqueous Solution Before Solidification

A fumaric acid aqueous solution and water glass were mixed, and dissolved with stirring as in Example 1. The thus-obtained aqueous solution was added to the base concrete used in Example 4 without being solidified. The amount of the aqueous solution added was 5 parts by weight per 100 parts by weight of cement. Consequently, the fluidity of the concrete was extremely decreased immediately after the addition, and it was difficult to pour the concrete in the form.

TABLE 1

|  | Tensile strength | | Compressive strength | | $\alpha$*[1] | |
|---|---|---|---|---|---|---|
|  | (N/mm²) | Ratio*[2] | (N/mm²) | Ratio*[2] |  | Ratio*[2] |
| aged 7 days | | | | | | |
| Comp. Ex. 1 | 1.54 | 1.00 | 19.57 | 1.00 | 0.21 | 1.00 |
| Ex. 4 | 2.44 | 1.58 | 24.34 | 1.24 | 0.29 | 1.38 |
| Ex. 5 | 2.42 | 1.58 | 22.09 | 1.13 | 0.31 | 1.48 |
| Ex. 6 | 2.13 | 1.39 | 24.45 | 1.25 | 0.25 | 1.19 |
| aged 28 days | | | | | | |
| Comp. Ex. 1 | 2.32 | 1.00 | 30.09 | 1.00 | 0.24 | 1.00 |
| Ex. 4 | 3.22 | 1.39 | 33.15 | 1.10 | 0.31 | 1.30 |
| Ex. 5 | 2.91 | 1.26 | 31.87 | 1.06 | 0.29 | 1.21 |
| Ex. 6 | 2.44 | 1.05 | 26.74 | 0.89 | 0.27 | 1.14 |
| aged 91 days | | | | | | |
| Comp. Ex. 1 | 2.54 | 1.00 | 32.31 | 1.00 | 0.25 | 1.00 |
| Ex. 4 | 3.52 | 1.39 | 36.13 | 1.12 | 0.32 | 1.28 |

Comp. Ex. 1 Absence of an admixture
Ex. 4 2.5 parts by weight of admixture A was added.
Ex. 5 2.5 parts by weight of admixture B was added.
Ex. 6 Admixtures A and B were added in an amount of 2.5 parts by weight each.
*[1]Tensile strength = $\alpha \times$ (compressive strength)$^{2/3}$
*[2]Ratio when the value in Comparative Example 1 was defined as 1.00.

Analysis of Results in Examples 4 to 6 and Comparative Example 1

Figure 5:
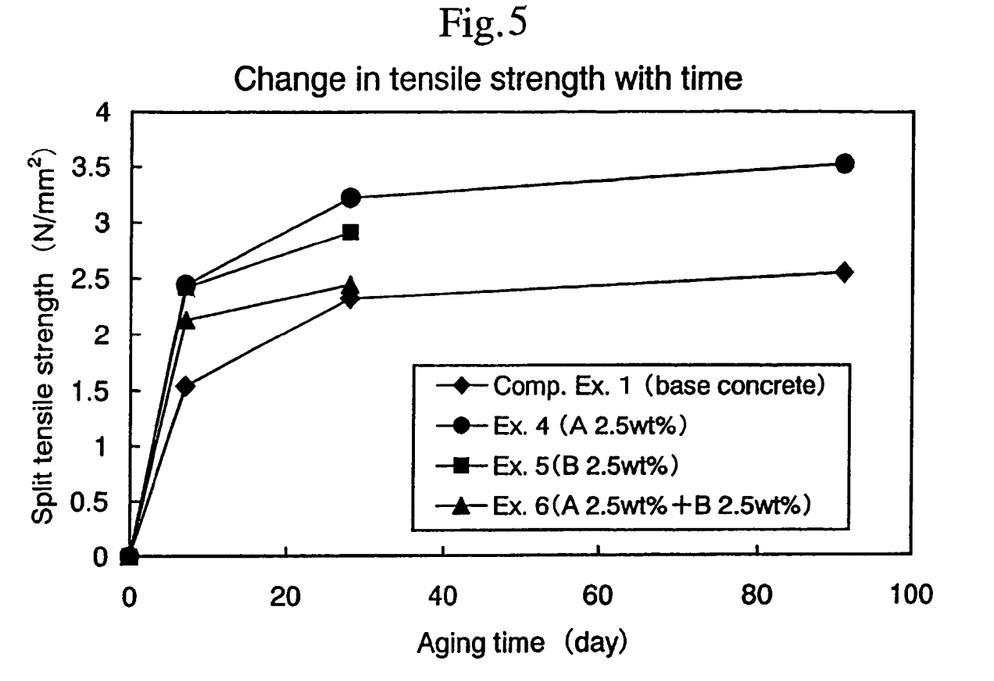
FIG. 5 is a graph showing a change in split tensile strength with time.
Figure 6:
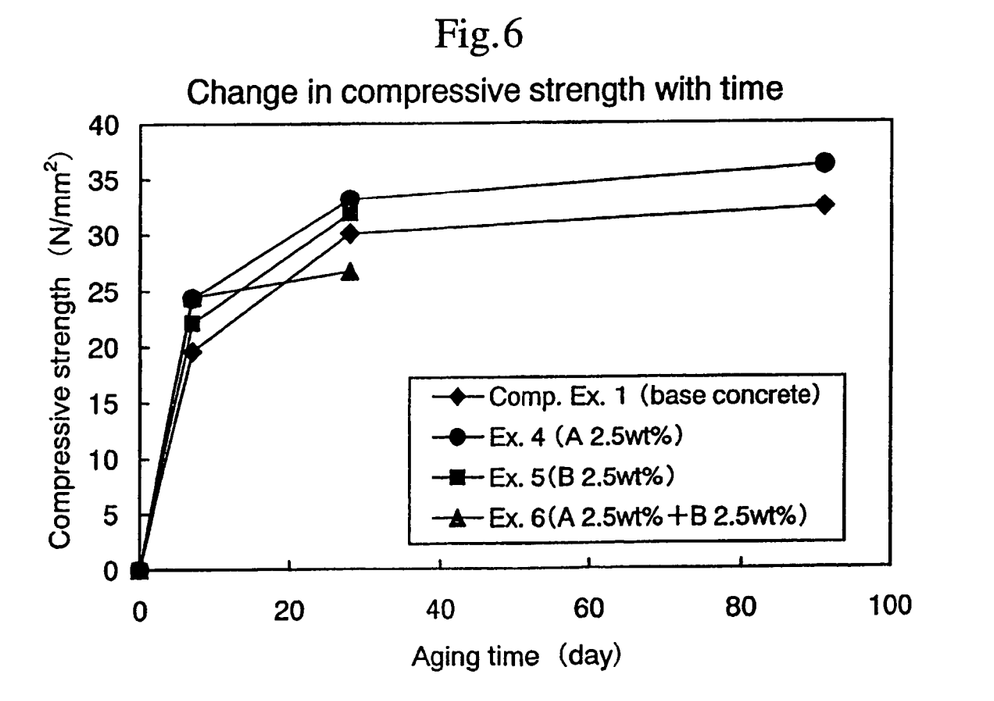
FIG. 6 is a graph showing a change in compressive strength with time.

The change in split tensile strength with time and the change in compressive strength with time on the concretes obtained in Examples 4 to 6 and Comparative Example 1 are shown in FIGS. 5 and 6 respectively. In Example 4 (containing admixture A), as compared to Comparative Example 1 (base concrete), the tensile strength of the sample aged 7 days was much improved by approximately 60%, and those of the samples aged 28 days and 91 days by approximately 40% respectively. Meanwhile, the compressive strength thereof was improved by only from 10 to 20%. Further, in Example 5 containing admixture B having a larger particle size than admixture A, the tensile strength was less improved than in Example 4. Also in Example 6 in which the amount of the concrete admixture was twice as large as those in Examples 4 and 5, the strengths were less improved than in Examples 4 and 5.

Figure 7:
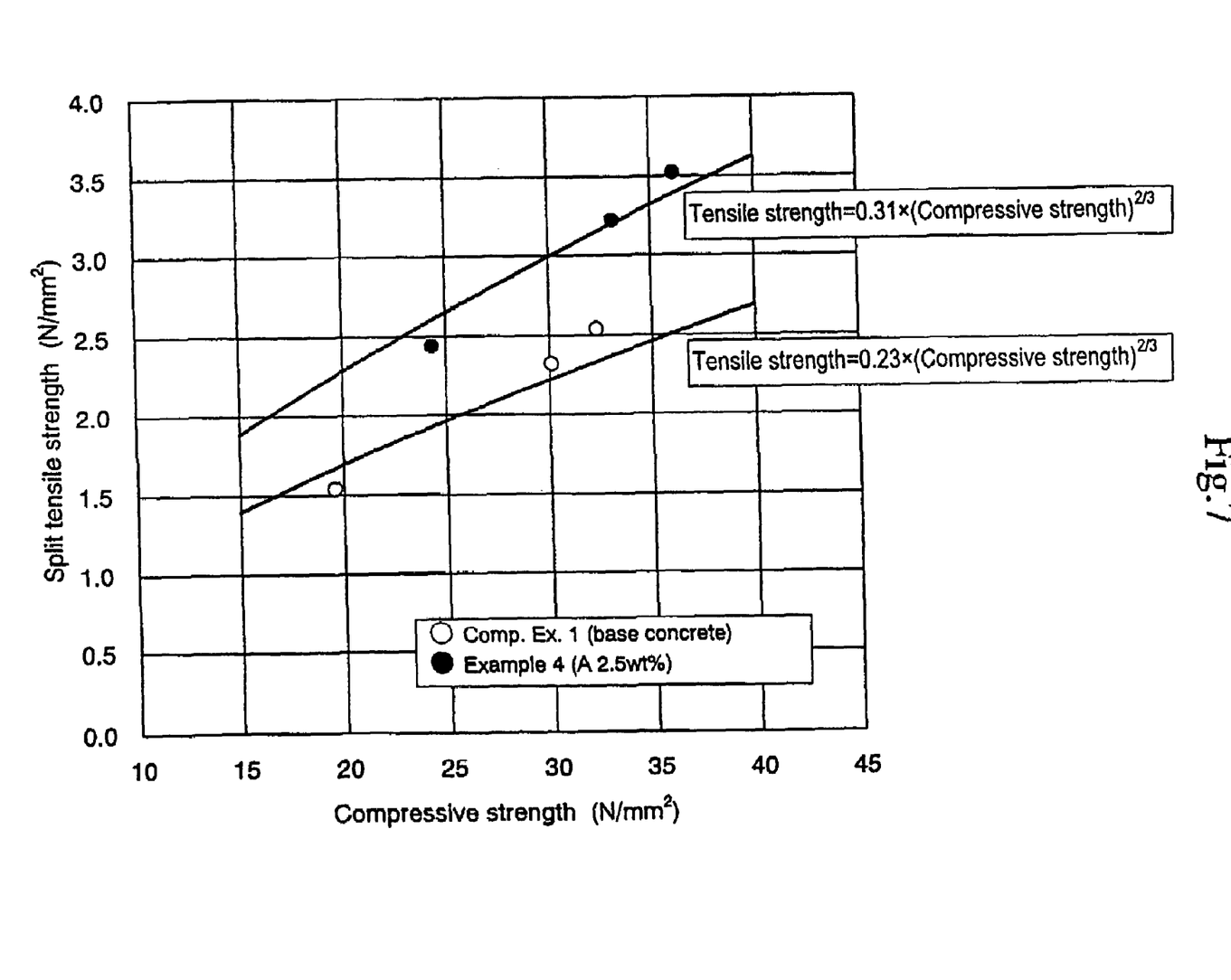
FIG. 7 is a graph showing a relation of a compressive strength and a split tensile strength.

With respect to strength data of the samples aged 7 days, 28 days and 91 days as obtained in Example 4 (containing admixture A) and Comparative Example 1 (base concrete), the compressive strength was plotted as abscissa and the split tensile strength as ordinate respectively. The results are shown in FIG. 7.

Consequently, the strength data obtained in Example 4 was close to a curve with $\alpha$ of 0.31 in formula (3), and the strength data obtained in Comparative Example 1 to a curve with $\alpha$ of 0.23 respectively.

That is, in Example 4 containing admixture A, as compared to the base concrete, $\alpha$ was improved by approximately 35%, and the tensile strength estimated from the same compressive strength was much improved by 35%. Thus, the concrete of the invention has the outstanding characteristic feature that the tensile strength is by far more improved than the compressive strength.

In Example 4 (containing admixture A), Example 5 (containing admixture B) and Comparative Example 1 (base concrete), the secant modulus of elasticity in compression of the samples aged 28 days was measured. Consequently, in all of the samples, the maximum compressive stress was shown with the strain of approximately 0.002, and no great difference was found in the stress. That is, although the secant modulus of elasticity in compression was slightly increased by adding the admixture of the invention, no great change was found in the compression behavior.

With respect to the concretes obtained in Example 4 (containing additive A) and Comparative Example 1 (base concrete), the pore size distribution was measured with a porosimeter. The results are shown in FIGS. 1 and 2 respectively. It was identified that by adding the admixture of the invention, pores having a pore size of from 0.5 to 10 µm were decreased and pores having a pore size of from 0.01 to 0.1 µm were increased.

The photos of the broken surfaces in the tensile test on the concretes obtained in Example 4 (containing admixture A) and Comparative Example 1 (base concrete) are shown in FIGS. 3 and 4 respectively. As is clear from FIG. 4, in the base concrete, a large number of broken portions are observed in the interface between the coarse aggregate and the mortar, showing that the transition zone is a brittle point. On the contrary, as shown in FIG. 3, in case of containing the admixture of the invention, a large number of broken portions are observed in the coarse aggregate, suggesting that the bonding strength in the transition zone is greatly improved.

Example 7

Production and Evaluation of a Concrete Containing Admixture C

For a ready mixed concrete used as a base concrete, the following raw materials were used.

1) Cement normal portland cement made by Taiheiyo Cement Corp., density 3.16 g/cm³, sodium content (calculated as $Na_2O$) 0.58% by weight.

2) Coarse Aggregate 1 crushed stone No. 5 from Hachioji, particle size from 5 to 20 mm, fineness modulus 7.04, surface-dry condition density 2.67 g/cm³, water absorption 0.55% by weight.

3) Coarse Aggregate 2 crushed stone No. 6 from Hachioji, particle size from 2.5 to 10 mm, fineness modulus 5.88, surface-dry condition density 2.67 g/cm³, water absorption 0.69% by weight.

4) Fine Aggregate soil sand from Kimitsu, particle size 5 mm or less, fineness modulus 2.64, surface-dry condition density 2.60 g/cm³, water absorption 2.23% by weight.

The proportions of the foregoing components are as follows. The parenthesized values are amounts per 100 parts by weight of cement. A slump of this base concrete is 8 cm.

| cement | 320.0 kg/m³ (100 parts by weight) |
|---|---|
| water | 176.0 kg/m³ (55 parts by weight) |
| coarse aggregate 1 | 564.3 kg/m³ (176 parts by weight) |
| coarse aggregate 2 | 376.2 kg/m³ (118 parts by weight) |
| fine aggregate | 842.2 kg/m³ (263 parts by weight) |

A concrete sample was produced as in Example 4 except that admixture C obtained in Example 2 was added to the base concrete in an amount of 2 parts by weight per 100 parts by weight of cement. Plural such samples were produced, and cured in air of 15° C. In this Example 7 and Comparative Example 3 to be described later, samples were produced on the same date using the same base concrete, and cured under the same atmosphere. The samples aged 7 days and 28 days were subjected to the same tests for measuring strengths as in Example 4. The resulting tensile strength, compressive strength and α are all shown in Table 2.

Comparative Example 3

Production and Evaluation of a Concrete Without Admixture

Concrete samples were produced by pouring the base concrete alone in the form without using admixture C in Example 7, and then cured as in Example 7. The samples aged 7 days and 28 days were subjected to the same tests for measuring strengths as in Example 4. The resulting tensile strength, compressive strength and α are all shown in Table 2.

TABLE 2

|  | Tensile strength | | Compressive strength | | $\alpha^{*1)}$ | |
| --- | --- | --- | --- | --- | --- | --- |
|  | (N/mm²) | Ratio*³⁾ | (N/mm²) | Ratio*³⁾ |  | Ratio*³⁾ |
| aged 7 days | | | | | | |
| Comp. Ex. 3 | 1.64 | 1.00 | 20.86 | 1.00 | 0.217 | 1.00 |
| Ex. 7 | 2.21 | 1.35 | 19.69 | 0.94 | 0.303 | 1.40 |
| aged 28 days | | | | | | |
| Comp. Ex. 3 | 1.97 | 1.00 | 28.71 | 1.00 | 0.210 | 1.00 |
| Ex. 7 | 2.45 | 1.24 | 28.14 | 0.98 | 0.265 | 1.26 |

Comp. Ex. 3 Absence of an admixture
Ex. 7 2 parts by weight of admixture C was added.
*¹⁾Tensile strength = α × (compressive strength)$^{2/3}$
*³⁾Ratio when the value in Comparative Example 3 was defined as 1.00.

As is apparent from Table 2, the concrete containing admixture C in Example 7 was clearly improved in tensile strength as compared to the concrete without admixture in Comparative Example 3. Meanwhile, the concrete in Example 7 was slightly decreased in compressive strength as compared to the concrete in Comparative Example 3. That is, only the tensile strength was selectively improved in comparison to the compressive strength, which was also shown by the increase in a. These test results are the same as those in Examples 4 to 6 using fumaric acid as the carboxylic acid, the raw material of the admixture. Thus, it was found that the effects of the invention could be brought forth even by using citric acid as the carboxylic acid.

Example 8

Production and Evaluation of a Concrete Containing Admixture D

A ready mixed concrete used as a base concrete was the same as that used in Example 7. A concrete sample was produced as in Example 4 except that admixture D obtained in Example 3 was added to the base concrete in an amount of 1 part by weight per 100 parts by weight of cement. Plural such samples were produced, and cured in air of 20° C. In this Example 8 and Comparative Example 4 to be described later, samples were produced on the same date using the same base concrete, and cured under the same atmosphere. The samples aged 7 days and 28 days were subjected to the same tests for measuring strengths as in Example 4. The resulting tensile strength, compressive strength and α are all shown in Table 3.

Comparative Example 4

Production and Evaluation of a Concrete Without Admixture

Concrete samples were produced by pouring the base concrete alone in the form without using admixture D in Example 8, and then cured as in Example 8. The samples aged 7 days and 28 days were subjected to the same tests for measuring strengths as in Example 4. The resulting tensile strength, compressive strength and α are all shown in Table 3.

TABLE 3

|  | Tensile strength | | Compressive strength | | $\alpha^{*1)}$ | |
| --- | --- | --- | --- | --- | --- | --- |
|  | (N/mm²) | Ratio*⁴⁾ | (N/mm²) | Ratio*⁴⁾ |  | Ratio*⁴⁾ |
| aged 7 days | | | | | | |
| Comp. Ex. 4 | 2.01 | 1.00 | 26.65 | 1.00 | 0.226 | 1.00 |
| Ex. 8 | 2.40 | 1.19 | 24.83 | 0.93 | 0.283 | 1.25 |
| aged 28 days | | | | | | |
| Comp. Ex. 4 | 2.42 | 1.00 | 35.23 | 1.00 | 0.225 | 1.00 |
| Ex. 8 | 2.73 | 1.13 | 34.44 | 0.98 | 0.258 | 1.15 |

Comp. Ex. 4 Absence of an admixture
Ex. 8 1 part by weight of admixture D was added.
*¹⁾Tensile strength = α × (compressive strength)$^{2/3}$
*⁴⁾Ratio when the value in Comparative Example 4 was defined as 1.00.

As is apparent from Table 3, the concrete containing admixture D in Example 8 was clearly improved in tensile strength as compared to the concrete without admixture in Comparative Example 4. Although the amount of admixture D in Example 8 was as small as 1 part by weight per 100 parts by weight of cement, the tensile strength was no doubt improved. Meanwhile, the concrete in Example 8 was slightly decreased in compressive strength as compared to the concrete in Comparative Example 4. That is, in this case as well, only the tensile strength was selectively improved in comparison to the compressive strength, which was also shown by the increase in a. Thus, it was found that even though the admixture having the low water content was used in the small amount, the tensile strength was improved.

Example 9

Production and Evaluation of a Mortar Containing Admixture A

The following raw materials were used in this Example.

1) Cement
   normal portland cement made by Taiheiyo Cement K.K., density 3.16 g/cm³, sodium content (calculated as Na₂O) 0.58% by weight.

2) Fine Aggregate
   soil sand from Kimitsu, particle size 5 mm or less, fineness modulus 2.64, surface-dry condition density 2.60 g/cm³, water absorption 2.23% by weight.

The foregoing cement, fine aggregate and water were first stirred with a forced action mixer for 1 minute, and admixture A obtained in Example 1 was then added. The blend was further stirred for 30 seconds. The proportions thereof are as follows. The parenthesized values are amounts per 100 parts by weight of cement.

| | |
|---|---|
| cement | 320.0 kg/m³ (100 parts by weight) |
| water | 176.0 kg/m³ (55 parts by weight) |
| fine aggregate | 842.2 kg/m³ (263 parts by weight) |
| admixture A | 6.4 kg/m³ (2 parts by weight) |

After stirred, the blend was poured in a cylindrical form having a diameter of 50 mm and a height of 100 mm to produce a mortar sample. This sample was formed according to JSCE-F506-1999. Plural such samples were produced, and cured in air of 20° C. In this Example 9 and Comparative Example 5 to be described later, samples were produced on the same date and cured under the same atmosphere. The samples aged 7 days and 28 days were subjected to the same tests for measuring strengths as in Example 4. The resulting tensile strength, compressive strength and α are all shown in Table 4.

Comparative Example 5

Production and Evaluation of a Mortar Without Admixture

Mortar samples were produced as in Example 9 except that cement, water and the fine aggregate were incorporated without using admixture A, and were cured as in Example 9. The samples aged 7 days and 28 days were subjected to the same tests for measuring strengths as in Example 4. The resulting tensile strength, compressive strength and α are all shown in Table 4.

TABLE 4

| | Tensile strength | | Compressive strength | | α[1] | |
|---|---|---|---|---|---|---|
| | (N/mm²) | Ratio[5] | (N/mm²) | Ratio[5] | | Ratio[5] |
| aged 7 days | | | | | | |
| Comp. Ex. 5 | 1.47 | 1.00 | 22.71 | 1.00 | 0.183 | 1.00 |
| Ex. 9 | 1.67 | 1.14 | 22.14 | 0.97 | 0.212 | 1.16 |
| aged 28 days | | | | | | |
| Comp. Ex. 5 | 1.91 | 1.00 | 33.00 | 1.00 | 0.186 | 1.00 |
| Ex. 9 | 2.36 | 1.24 | 32.05 | 0.97 | 0.233 | 1.25 |

Comp. Ex. 5 Absence of an admixture
Ex. 9 2 parts by weight of admixture A was added.
[1]Tensile strength = α × (compressive strength)$^{2/3}$
[5]Ratio when the value in Comparative Example 5 was defined as 1.00.

As is apparent from Table 4, the mortar containing 2 parts by weight of admixture A per 100 parts by weight of cement in Example 9 was improved in tensile strength as compared to the mortar without admixture in Comparative Example 5. The extent of the improvement was less than the extent of the improvement in the concrete containing 2.5 parts by weight of admixture A per 100 parts by weight of cement in Example 4. Thus, the effect of the improvement in tensile strength provided by adding the admixture of the invention is greater in the concrete than in the mortar. However, in the mortar as well, the tensile strength is no doubt improved, and the bonding strength seems likely to be improved also on the surface of the fine aggregate, though its extent is not so high as that on the surface of the coarse aggregate. Meanwhile, the compressive strength of the mortar in Example 9 was slightly decreased in comparison to the mortar in Comparative Example 4. In the mortar, as in the concrete, the tensile strength was selectively improved in comparison to the compressive strength, which was also shown by the increase in α. That is, the admixture of the invention, when added to the mortar, can also improve the tensile strength.

As has been thus far described, the concrete containing the concrete admixture of the invention is greatly improved in tensile strength as compared to the compressive strength and can reduce cracks in the concrete structure or decrease an amount of steel used. This concrete admixture can be used only by adding it to a fluid concrete, and the fluidity of the concrete can be maintained. It is thus possible to provide a concrete which is advantageously used in large-sized, diversified concrete structures, and further to provide a concrete which is advantageously used in various concrete products.

The mortar containing the mortar admixture of the invention is also greatly improved in tensile strength as compared to the compressive strength, and can advantageously be used in products which are susceptible to a tensile stress due to an external force or a thermal stress and products which tend to be influenced by fatigue. Further, the mortar is also useful for products with complicated shapes or thin products, and can therefore provide various mortar products. The blended concrete of the invention is useful for producing a concrete or a mortar excellent in tensile strength.

The invention claimed is:

1. A process for producing a concrete which comprises blending cement, an aggregate, water and an admixture, wherein the admixture comprises a powder or granules containing a reaction product of an alkali metal silicate and a carboxylic acid, wherein a ratio of a metal atom of the silicate to a carboxyl group of the carboxylic acid is from 1 to 200, a water content is 50% by weight or less, and an amount of particles which are passed through a 2.5 mm-mesh sieve is 50% by weight or more.

2. The process for producing a concrete as claimed in claim 1, wherein in the admixture, the silicate is sodium silicate.

3. The process for producing a concrete as claimed in claim 1, wherein in the admixture, a ratio of a metal atom to a silicon atom in the silicate is from 0.1 to 2.

4. The process for producing a concrete as claimed in claim 1, wherein in the admixture, the carboxylic acid is an oxycarboxylic acid or a polycarboxylic acid.

5. The process for producing a concrete as claimed in claim 1, wherein in the admixture, fine particles having a particle size of less than 100 μm, are not used as main particles.

6. The process for producing a concrete as claimed in claim 1, wherein in the admixture, the amount of particles which are not passed through a 1.25 mm-mesh sieve is 50% by weight or more.

7. The process for producing a concrete as claimed in claim 1, wherein 100 parts by weight of cement, from 300 to 1,200 parts by weight of the aggregate, from 20 to 75 parts by weight of water and from 0.1 to 20 parts by weight of the admixture are blended.

8. The process for producing a concrete as claimed in claim 7, which comprises blending from 0.1 to 10 parts by weight of the admixture per 100 parts by weight of cement.

9. The process for producing a concrete as claimed in claim 8, which comprises blending from 0.1 to 5 parts by weight of the admixture per 100 parts by weight of cement.

10. The process for producing a concrete as claimed in claim 1, wherein the admixture is added to a fluid concrete comprising cement, the aggregate and water, and the blend is then placed in a form.

11. The process for producing a concrete as claimed in claim 1, wherein blended cement comprising the admixture and cement is blended with the aggregate and water.

12. The process for producing a concrete as claimed in claim 1, wherein the water content of the admixture is 10% by weight or less.

13. A process for producing a mortar which comprises blending cement, a fine aggregate, water and an admixture, wherein the admixture comprises a powder or granules containing a reaction product of an alkali metal silicate and a carboxylic acid, wherein a ratio of a metal atom of the silicate to a carboxyl group of the carboxylic acid is from 1 to 200, a water content is 50% by weight or less, and an amount of particles which are passed through a 2.5 mm-mesh sieve is 50% by weight or more.

14. The process for producing a mortar as claimed in claim 13, wherein in the admixture, fine particles having a particle size of less than 100 μm, are not used as main particles.

15. The process for producing a mortar as claimed in claim 13, wherein in the admixture, the amount of particles which are not passed through a 1.25 mm-mesh sieve is 50% by weight or more.

16. The process for producing a mortar as claimed in claim 13, wherein 100 parts by weight of cement, from 100 to 800 parts by weight of the fine aggregate, from 20 to 75 parts by weight of water and from 0.1 to 20 parts by weight of the admixture are blended.

17. The process for producing a mortar as claimed in claim 16, which comprises blending from 0.1 to 10 parts by weight of the admixture per 100 parts by weight of cement.

18. The process for producing a mortar as claimed in claim 17, which comprises blending from 0.1 to 5 parts by weight of the admixture per 100 parts by weight of cement.

19. The process for producing a mortar as claimed in claim 13, wherein blended cement comprising the admixture and cement is blended with the fine aggregate and water.

20. The process for producing a mortar as claimed in claim 19, wherein the water content of the admixture is 10% by weight or less.

* * * * *